United States Patent [19]

Omae et al.

[11] Patent Number: 4,839,834

[45] Date of Patent: Jun. 13, 1989

[54] SPEED DETECTING APPARATUS

[75] Inventors: Tsutomu Omae; Toshihiko Matsuda; Youjirou Miyahara; Kenzo Kamiyama, all of Hitachi, Japan

[73] Assignee: Hitachi, Ltd., Tokyo, Japan

[21] Appl. No.: 2,202

[22] Filed: Jan. 12, 1987

[30] Foreign Application Priority Data

Jan. 13, 1986 [JP] Japan .................................. 61-3453

[51] Int. Cl.⁴ ............................ G01P 3/48; G01P 3/54
[52] U.S. Cl. .................................... 364/565; 324/166; 364/550; 377/20
[58] Field of Search .................... 364/565; 340/347 P; 324/163, 166; 377/20, 24

[56] References Cited

U.S. PATENT DOCUMENTS

| | | | |
|---|---|---|---|
| 4,274,142 | 6/1981 | Furuhashi et al. | 364/565 |
| 4,445,110 | 4/1984 | Breslow | 340/347 P |
| 4,484,137 | 11/1984 | Chang | 324/166 |
| 4,547,667 | 10/1985 | Sasaki et al. | 340/347 P |
| 4,581,713 | 4/1986 | Fennel | 364/565 |
| 4,584,528 | 4/1986 | Ohmae et al. | 324/166 |
| 4,680,721 | 7/1987 | Pluddemann | 364/565 |
| 4,691,192 | 9/1987 | Baker | 340/347 P |
| 4,712,186 | 12/1987 | Fromme | 364/565 |

FOREIGN PATENT DOCUMENTS 0059244 10/1981 European Pat. Off. .
2549953 5/1977 Fed. Rep. of Germany .

OTHER PUBLICATIONS

"Wide-Range Precision Speed Measurement with Adaptive Optimization Using a Microcomputer", by N. Chaudhuri et al., pp. 369-373, IEEE Transactions on Industrial Electronics, vol. 1E-30, No. 4, Nov. '83.

Primary Examiner—Parshotam S. Lall
Assistant Examiner—Kevin J. Teska
Attorney, Agent, or Firm—Antonelli, Terry & Wands

[57] ABSTRACT

In a speed detecting apparatus for detecting the rotational speed of a rotating body mechanically coupled thereto, an encoder generates one cycle of a sine-wave signal each time its angular position of rotation changes by a predetermined unit amount. A zero-crossing pulse is generated at each zero-crossing point of the sine-wave signal generated from the encoder, and the phase angle of the sine-wave signal is detected on the basis of the zero-crossing point of the sine-wave signal generated from the encoder. In a high speed range, the rotational speed is detected on the basis of the ratio between the number of zero-crossing pulses and the time interval between a first one and a last one of the plural zero-crossing pulses. On the other hand, in a low speed range, the rotational speed is detected on the basis of the combination of the number of the zero-crossing pulses appearing within a predetermined period of time and the phase angle of the sine-wave signal.

11 Claims, 4 Drawing Sheets

SPEED DETECTING APPARATUS

BACKGROUND OF THE INVENTION

1. FIELD OF THE INVENTION

This invention relates to a speed detecting apparatus suitable for use for controlling the speed of a rotating body or a moving body in a digital manner.

2. DESCRIPTION OF THE PRIOR ART

For the detection of the rotational speed of, for example, an electric motor as a digital signal, an encoder is generally used which generates a pulse signal whose frequency is proportional to the rotational speed of the motor. The encoder generates one pulse each time it rotates by an amount corresponding to 1/m (m: a large integer) of one complete revolution. A train of such pulses generated from the encoder is processed to detect the rotational speed of the motor. According to a known method as, for example, disclosed in JP-A-57-144465 (corresponding to U.S. Pat. No. 4,584,528), the rotational speed of a motor is detected with high accuracy by counting the number of pulses generated from an encoder mechanically coupled to the motor, and measuring the time in synchronous relation with the counting operation counting the number of the pulses. However, this method has the problem that speed detection is impossible in a low speed range where the output pulse frequency of the encoder is very low. A method to deal with such a problem is reported in the Society for the Research of Industrial Power Applications of the Institute of Electrical Engineers of Japan, IA-85-11 (1985). According to the reported method, an encoder generating a sine-wave signal is used, and the rotational speed of an associated motor is detected by detecting the rotational phase of the encoder from the analog output signal of the encoder and computing the rotational speed on the basis of a variation of the rotational phase. Although the latter method is advantageous in that the rotational speed can be detected with high resolution even in a low speed range, difficulty is encountered in high-accuracy speed detection due to, for example, distortion of the waveform of the sine-wave signal. Thus, the former method is defective from the aspect of the resolution in a low speed range, and the latter method is defective in the lack of consideration of the accuracy of speed detection. It has therefore been difficult to detect rotational speed with high resolution and high accuracy over a wide speed range, according to the prior art methods.

SUMMARY OF THE INVENTION

It is a primary object of the present invention to provide a speed detecting apparatus which can detect the speed of, for example, a rotating body with high resolution and high accuracy over a wide speed range.

The speed detecting apparatus according to the present invention is featured in that it uses an encoder which generates a sine-wave signal whose frequency is proportional to the rotational speed of a rotating body and that, in a high speed range, the rotating speed of the rotating body is detected on the basis of the number of occurrences of zero volts (zero-crossing) in the waveform of the sine-wave signal within substantially a predetermined period of time and the time interval between the first and last zero-crossing points, but, in a low speed range, the rotating speed of the rotating body is detected on the basis of the difference between the phase angle of the sine-wave signal detected at present time in relation to the zero-crossing point of the waveform of the sine-wave signal and the phase angle detected at a time earlier by a predetermined period of time than the present time.

DESCRIPTION OF THE PREFERRED EMBODIMENTS

Figure 1:
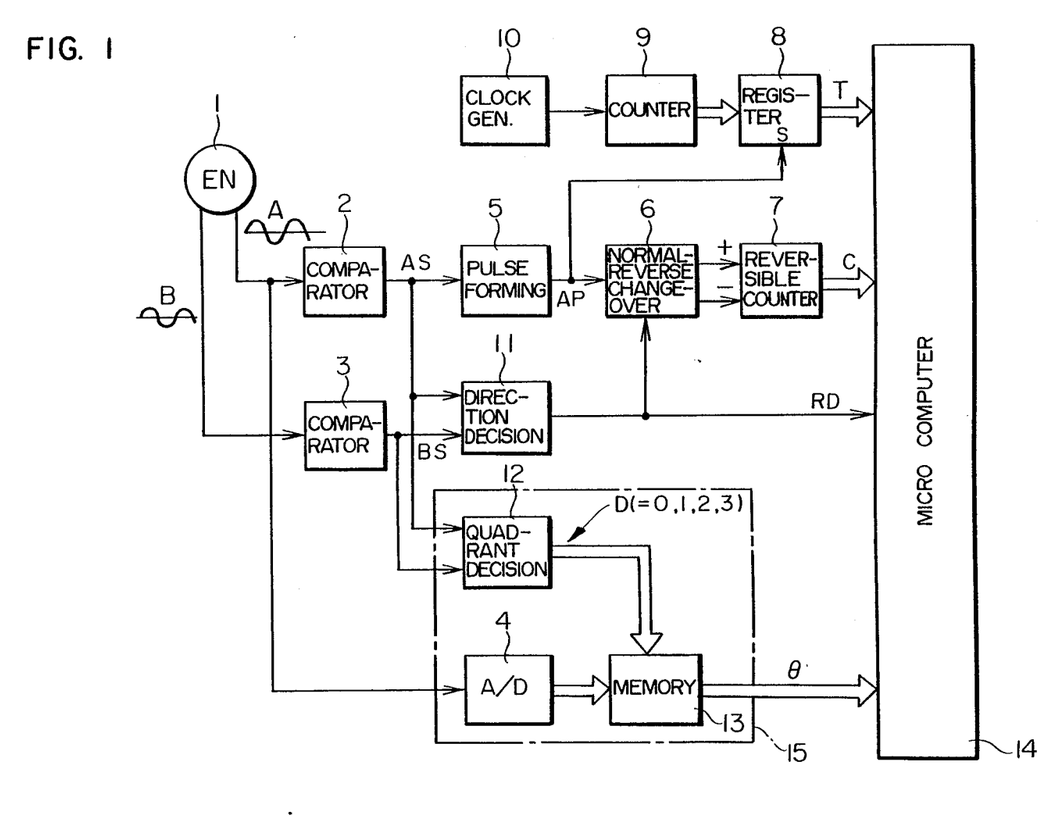
FIG. 1 is a block diagram showing the structure of an embodiment of the speed detecting apparatus of the present invention.

FIG. 1 is a block diagram showing the structure of the embodiment of the speed detecting apparatus according to the present invention.

Referring to FIG. 1, an encoder 1 mechanically coupled to an electric motor (not shown) generates sine-wave signals A and B, having a phase difference of 90° therebetween, when it rotates by an amount corresponding to 1/m (m: a large integer) of one complete encoder revolution. The output signals A and B of the encoder 1 are applied to comparators 2 and 3 where the signals A and B are compared with zero volts and are converted into squarewave signals AS and BS respectively. It will be seen in FIGS. 2 and 3 that the positive half wave of the signals A and B corresponds to the "1" level of the signals AS and BS. The sine-wave signal A is applied also to an A/D converter 4. The square-wave signal AS is applied to a pulse forming circuit 5. In synchronism with the leading edge and trailing edge of the waveform of the square-wave signal AS, the pulse forming circuit 5 generates zero-crossing pulses AP. This zero-crossing pulse signal AP is applied to a reversible counter 7 through a normal-reverse change-over circuit 6. In response to a direction decision signal RD applied from a direction decision circuit 11, described later, the normal-reverse change-over circuit 6 changes over the polarity of the zero-crossing pulse signal AP. More precisely, the count of the reversible counter 7 is incremented when the encoder 1 rotates in the normal direction, but the count of the reversible counter 7 is decremented when the encoder 1 rotates in the reverse direction. The zero-crossing pulse signal AP is applied also to a set terminal SET of a register 8. As soon as a pulse of the zero-crossing pulse signal AP is applied to the set terminal SET of the register 8, the count of a clock counter 9 is transferred to and registered in the register 8. A clock pulse generator 10 generates clock pulses at a predetermined frequency, and the clock counter 9 counts these clock pulses. The frequency of the clock pulses generated from the clock pulse generator 10 is selected to be higher, by one decimal place or more, than the maximum operating frequency of the encoder 1. In the meantime, the square-wave signals AS and BS are applied to a direction decision circuit 11 and a quadrant decision circuit 12. The operation of the direction decision circuit 11, which discriminates the direction of rotation of the encoder 1, is such that it decides that the encoder 1 is rotating in the normal direction when the phase of the square-wave signal AS lags that of the square-wave signal BS, but it decides that the encoder 1 is rotating in the reverse direction when the phase of the square-wave signal AS leads that of the square-wave signal BS. The phase relationship between the square-wave signals AS and BS can be identified, for example, by reference to the level of the square-wave signal BS at the rise time of the square-wave signal AS. Depending on the relative levels of the square-wave signals AS and BS, the quadrant decision circuit 12 decides the quadrant $(0-\pi/2, \pi/2-\pi, \pi-3\pi/2, 3\pi/2-2\pi)$ of the square-wave signal As and generates a 2-bit quadrant decision signal D. That is, the 2-bit quadrant decision output signal D of the quadrant decision circuit 12 represents 0 (the first quadrant) when both the square-wave signals AS and BS are in their "1" level; 1 (the second quadrant) when the square-wave signal AS only is in its "1" level; 2 (the third quadrant) when both the square-wave signals AS and BS are in their "0" level; and 3 (the fourth quadrant) when the square-wave signal BS only is in its "1" level. This 2-bit quadrant decision signal D is used to select a corresponding area of a memory 13 which stores a table of values of four kinds of inverse sine functions $(\sin^{-1})$. The combination of the A/D converter 4, the quadrant decision circuit 12 and the memory 13 constitutes a phase angle detecting circuit 15 detecting the phase angle $\theta$ of the sine-wave signal A. A microcomputer 14 fetches the contents of the reversible counter 7, register 8 and memory 13 and executes necessary computation for speed detection at an interval of a predetermined period of time.

Figure 2:
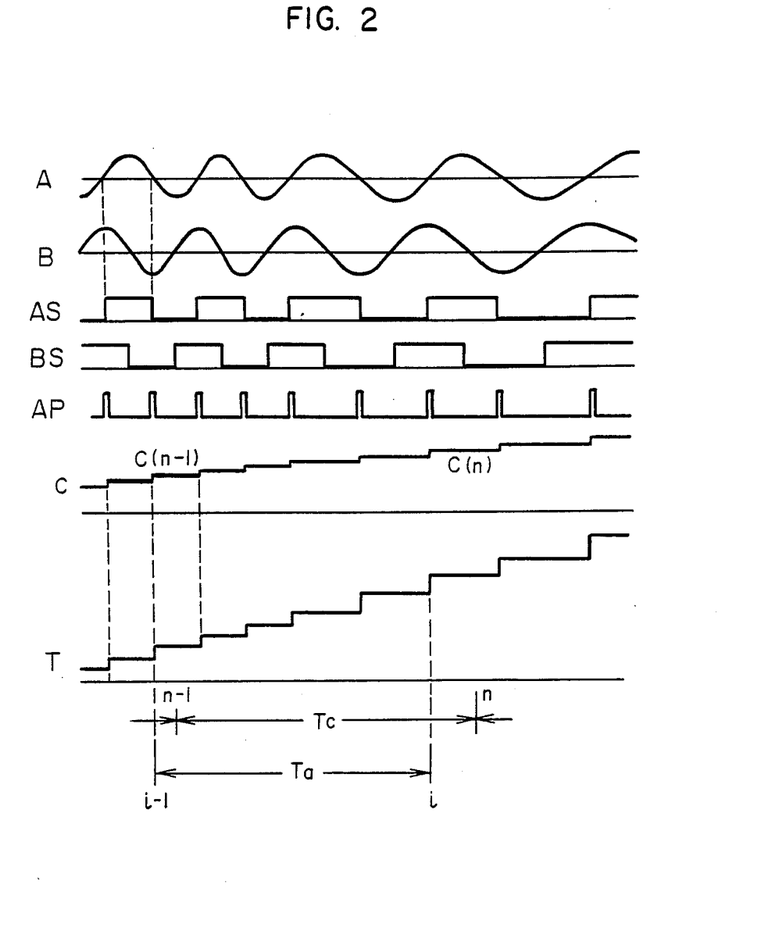
FIGS. 2 and 3 are time charts illustrating the operation of the apparatus shown in FIG. 1.

The operation of the speed detecting apparatus of the quadrant invention will now be described in detail with reference to FIGS. 2 to 4. FIG. 2 is an operation time chart in a high speed range, and FIG. 3 is an operation time chart in a low speed range.

Figure 3:
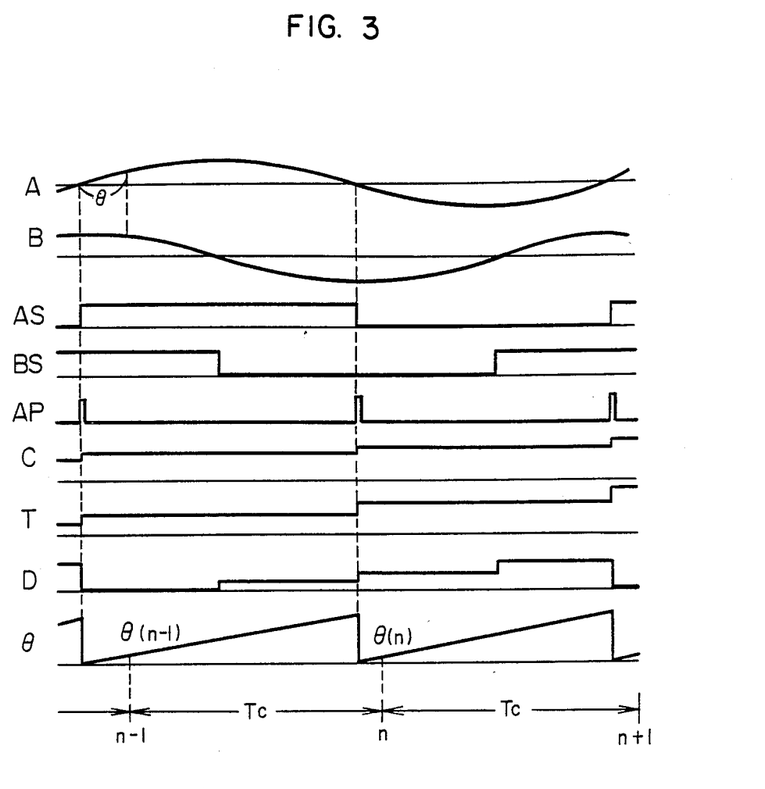

With the rotation of the encoder 1, the sine-wave signals A and B, having the phase difference of 90° therebetween as shown in FIGS. 2 and 3, are generated. These sine-wave signals A and B are applied to the comparators 2 and 3 where the signals A and B are converted into the square-wave signals AS and BS having their "1" level corresponding to the positive half wave of the signals A and B respectively. In synchronism with the leading edge and trailing edge of the squarewave signal AS, the pulse forming circuit 5 generates the zero-crossing pulses AP. This zero-cross pulse signal AP is applied to the reversible counter 7 to increment the count of the reversible counter 7 when the encoder 1 is rotating in the normal direction, but to decrement the count of the reversible counter 7 when the encoder 1 is rotating in the reverse direction. Thus, the count output C of the reversible counter 7 is indicative of the angular position of rotation of the encoder 1. Suppose, for example, that the sine-wave signals A and B are generated from the encoder 1 each time the encoder 1 rotates by an amount corresponding to 1/m of one complete encoder revolution. In such a case, the amount of rotation of the encoder 1 is C(n)/2m, when the count output C of the reversible counter 7 is C(n).

In the meantime, the zero-crossing pulse signal AP is applied to the register 8 as a set signal. The register 8 stores the count of the clock counter 9 at the moment of application of a pulse of the zero-cross pulse signal AP to the register 8. Since the clock counter 9 counts the clock pulses having the predetermined frequency, the count output of the clock counter 9 is indicative of time. Thus, the output T of the register 8 changes stepwise with time as shown in FIGS. 2 and 3, and the amount of change, corresponding to one step, of the output T of the register 8 indicates the period of time required for the encoder 1 to rotate by the amount corresponding to ½m of one complete encoder revolution.

On the other hand, the direction decision circuit 11 discriminates the direction of rotation of the encoder 1 on the basis of the relative levels of the square-wave signals AS and BS. In the case shown in FIGS. 2 and 3, the phase of the square-wave signal BA leads that of the square-wave signal AS. Therefore, the direction decision circuit 11 decides that the encoder 1 is rotating in the normal direction, and the direction decision signal RD of "1" level appears from the direction decision circuit 11. The phase angle detecting circuit 15, constituted by the combination of the quadrant decision circuit 12, the A/D converter 4 and the memory 13, detects the phase angle $\theta$ of the sine-wave signal A. The A/D converter 4 converts the analog sine-wave signal A into a corresponding digital signal. The digital output signal from the A/D converter 4 is converted into a corresponding phase angle $\theta$ in the memory 13 which stores the table of the values of the four kinds of inverse sine functions. Consider now that the phase angle $\theta$ of the sine-wave signal A is in the range of o to $\pi$ radians. In this case, there are two different phases $\theta$ and $(\pi-\theta)$ of the same value. The output signal (the quadrant decision signal) D of the quadrant decision circuit 12 is utilized for discriminating between these two different phase so as to find out the correct phase from the table of inverse sine functions. As described already, the memory 13 stores a table of the values of the four kinds of inverse sine functions. In the memory 13, the table portion, corresponding to two kinds of inverse sine functions among the four, stores the phase range of 0 to $\pi$ radians divided into N bits. When the quadrant decision signal D is indicative of 0, the function table portion corresponding to the phase range of 0 to $\pi/2$ radians in the memory 13 is retrieved. Similarly, when the quadrant decision signal D is indicative of 1, the function table portion corresponding to the phase range of $\pi/2$ to $\pi$ radians in the memory 13 is retrieved. Therefore, a phase angle signal indicative of a phase angle $\theta$ as, for example, shown in FIG. 3 appears from the memory 13.

Figure 4:
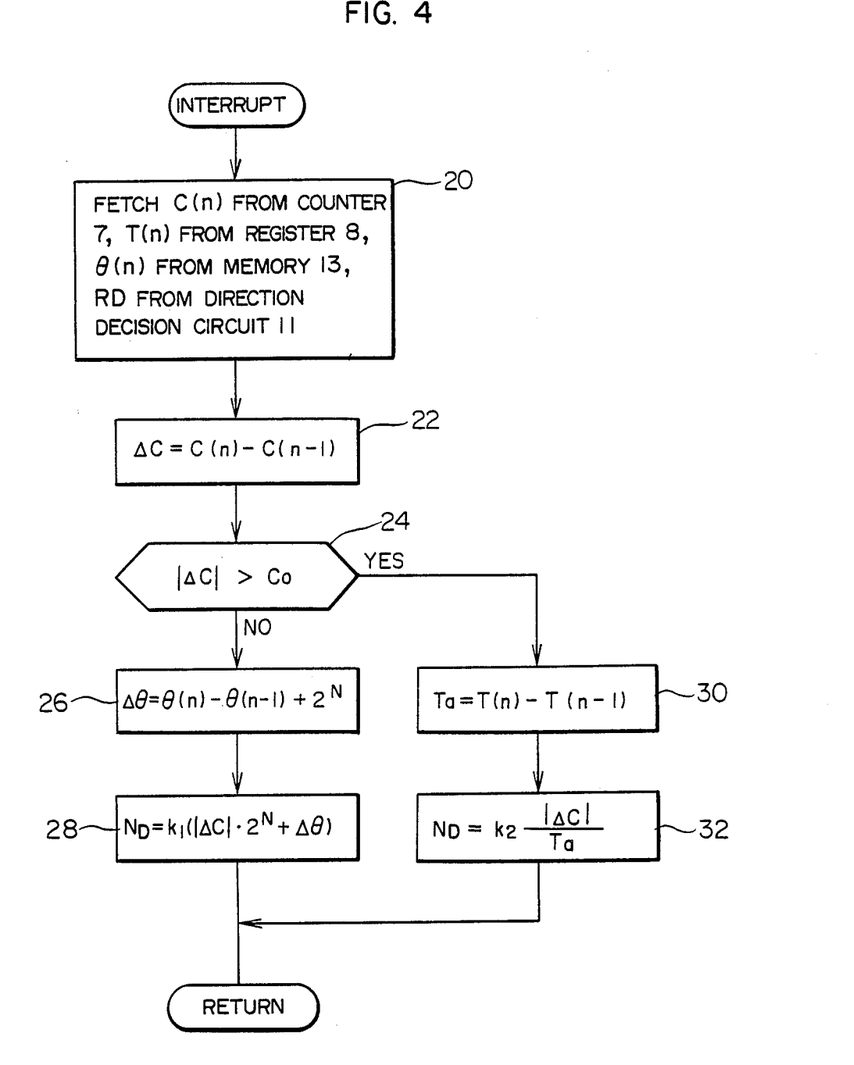
FIG. 4 is a flow chart showing the steps of processing by the microcomputer shown in FIG. 1.

The microcomputer 14 fetches the outputs of the reversible counter 7, register 8, direction decision circuit 11 and memory 13 and executes a processing sequence as shown in the flow chart of FIG. 4 at an interval of a predetermined period Tc. The length of time of this predetermined period Tc is about 5 to 10 ms.

In step 20 in FIG. 4, the microcomputer 14 fetches the output C(n) of the reversible counter 7, the output T(n) of the register 8, the output $\theta$(n) of the memory 13 and the output RD of the direction decision circuit 11. The symbol n in the outputs C(n), T(n) and $\theta$(n) indicates an n-th time of data detection. In step 22, the difference $\Delta$C between the present count C(n) and the previous count C(n−1) of the reversible counter 7 is computed. As shown in FIG. 2, this difference $\Delta$C indicates the amount of change of the angular position of rotation of the encoder 1 during a period Ta of from time (i−1) to time i. The amount of change of the angular position of rotation of the encoder 1 during the period Ta is substantially equal to that during the period Tc. Therefore, the difference $\Delta$C is generally indicative of the speed change of the encoder 1. When the absolute value of the difference $\Delta$C is larger than a predetermined setting $C_0$, it indicates that the encoder 1 is rotating at a high speed. In step 24, judgment is made as to whether or not the absolute value of the difference $\Delta$C is larger than the setting $C_0$, and, when the result of judgment is YES, the step 24 is followed by step 30. In this step 30, the different Ta between the present output $T(n)$ and the previous output $T(n-1)$ of the register 8 is computed. As seen in FIG. 2, the data T registered in the register 8 is held at the same level until the next zero-crossing pulse AP is applied to the register 8. Therefore, the data output of the register 8 fetched at the n-th time of data detection indicates the data of the register 8 detected at time i in FIG. 2. That is, the register 8 stores the data of the time at the moment of appearance of the zero-crossing point of the waveform of the sine-wave signal A generated from the encoder 1. Therefore, in step 32, the rotation speed $N_D$ of the encoder 1 can be accurately computed according to the equation $N_D = k_2 |\Delta C|/T_a$, where $|\Delta C|$ is the absolute value of the distance of angular rotation of the encoder 1 during the period Ta, and $k_2$ is a constant.

On the other hand, when the result of judgment in the step 24 is NO, the rotation speed $N_D$ of the encoder 1 is low, and the sine-wave signal A has a waveform as shown in FIG. 3. In this case, the phase angle $\theta(n)$ detected in the step 20 and the previously detected phase angle $\theta(n-1)$ are used to compute, in step 26, the value $\Delta\theta$ of the phase angle $\theta$, which has changed within the predetermined period of measurement Tc, according to the equation $\Delta\theta = \theta(n) - \theta(n-1) + 2^N$. In the equation shown in the step 26, 180° of the sine-wave signal A generated from the encoder 1 is represented by a digital value designated by $2^N$. On the other hand, when the distance $\Delta C$ of angular rotation of the encoder 1 exceeds the value corresponding to 180°, its absolute value $|\Delta C|$ is multiplied by the weight $2^N$, and the resultant value is added to the phase difference $\Delta\theta$. Since the period Tc is constant, the detected rotation speed $N_D$ of the encoder 1 is proportional to $(|\Delta C| \cdot 2^N + \Delta\theta)$. In step 28, the rotational speed $N_D$ of the encoder 1 is computed according to the equation $N_D = k_1(|\Delta C| \cdot 2^N + \Delta\theta)$, where $k_1$ is a constant.

The constant $C_o$ used in the step 24 is preferably determined as described now. In the application of the present invention to an electric motor, it is required to ensure the accuracy of control at speeds higher than a certain value, but it is merely required to retain the rotation of the motor at speeds lower than that value. Therefore, according to a first method, the constant $C_o$ is selected to determine the lowest rotational speed at which the accuracy of control is ensured. According to a second method, the result of judgment made in the step 24 is always YES so that the processing in the steps 30 and 32 can be necessarily executed. For this purpose, the constant $C_o$ is preferably selected to be $C_o = 0$. When the constant $C_o$ is so selected, the processing in the steps 30 and 32 is necessarily executed to detect the rotational speed $N_D$ of the encoder 1 when the zero-crossing point of the waveform of the sine-wave A appears at least once within the detection period Tc.

It will be seen from the above manner of speed detection according to the present invention that, when the rotational speed of the encoder 1 is high, the accurate angular position of rotation of the encoder 1 is measured on the basis of zero-crossing points of the waveform of the sine-wave signal A, and the period of time within which the above angular rotation of the encoder 1 has occurred is measured in synchronism with the zero-crossing points of the waveform of the sine-wave signal A, thereby computing the rotational speed of the encoder 1. Therefore, the rotational speed of the encoder 1 can be detected with high accuracy. It will be also seen that, when the rotational speed of the encoder 1 is low, the phase angle $\theta$ detected within one cycle of the sine-wave signal A is used for the computation of the rotational speed of the encoder 1. Therefore, even at a very low speed where no zero-crossing pulse AP may appear within the measuring period Tc, the rotation speed of the encoder 1 can be detected with improved resolution.

In an encoder commonly used for the purpose of speed detection of a motor, a zero-cross point of a sine-wave signal generated from the encoder coincides with a corresponding angular position of rotation of the encoder with an accuracy of about ±5%. Also, any error attributable to non-coincidence therebetween is rendered null when the encoder makes one complete revolution. Therefore, when the zero-crossing point is counted a plurality of times ($\Delta C$ times), an error of the angular position of rotation of the encoder attributable to the aforementioned non-coincidence is decreased to about $\pm 5/\Delta C\%$. Thus, the rotational speed in a high speed range can be detected with high accuracy by accurately measuring the number of times $\Delta C$ of appearance of the zero-crossing points, accurately measuring the period Ta of measurement of $\Delta C$ in synchronism with the zero-crossing points, and then computing the value of $\Delta C/T_a$. On the other hand, in a low speed range where high accuracy of speed detection is not so required, the rotational speed can be detected with high resolution by measuring the number of times $\Delta C$ of appearance of the zero-cross points within a predetermined period Tc, measuring a corresponding variation $\Delta\theta$ (rad) of the rotational phase angle within that period Tc, and computing $(k_1 \cdot \Delta C + \Delta\theta)$.

It will be understood from the foregoing detailed description of the present invention that, when a motor is rotating at a high speed, the zero-crossing point of a sine-wave signal generated from an associated encoder is noted for the detection of the rotational speed of the motor, while when the motor is rotating at a low speed, the phase angle of the sine-wave signal generated from the encoder is noted for the detection of rotational speed of the motor. Therefore, the rotational speed of the motor can be detected with high accuracy and high resolution over a wide speed range.

We claim:

1. A speed detecting apparatus for detecting the rotational speed of a rotating body mechanically coupled to said apparatus, said apparatus comprising:

an encoder for generating one cycle of a sine-wave signal each time the encoder angular position changes by a predetermined unit amount;

pulse generating means responsive to the sine-wave signal for generating a zero-crossing pulse at each zero-crossing of the sine-wave signal;

phase angle detecting means responsive to the sine-wave signal for generating a phase angle signal indicative of the phase angle of the sine-wave signal;

a clock pulse source for providing clock pulses having a predetermined frequency;

time computing means responsive to the zero-crossing pulses and the clock pulses for generating a time signal by counting clock pulses generated between two zero-crossing pulses; and speed computing means receiving the zero-crossing pulses, the phase angle signal, and the time signal as inputs, and responsive to the rotational speed of said encoder being above a predetermined level for detecting the rotational speed of said encoder on the basis of the reciprocal of the time interval between a first one and a last one of a plurality of the zero-crossing pulses, and responsive to the rotational speed of said encoder being below the predetermined level for detecting the rotational speed of said encoder on the basis of the number of zero-crossing pulses appearing within a predetermined period of time and the phase angle signal.

2. A speed detecting apparatus for detecting the rotational speed of a rotating body mechanically coupled to said apparatus, said apparatus comprising:
- an encoder for generating one cycle of each of two sine-wave signals, having a phase difference of 90° therebetween, each time the encoder angular position changes by a predetermined unit amount;
- pulse generating means responsive to one of the sine wave signals for generating a zero-crossing pulse at each zero-crossing point of the one of the sine-wave signals;
- phase angle detecting means responsive to the two sine-wave signals for generating a phase angle signal indicative of the phase angle of the one of the sine-wave signals;
- a clock pulse source for providing clock pulses having a predetermined frequency;
- time computing means responsive to the zero-crossing pulses and the clock pulses for generating a time signal by counting clock pulses generated between two zero-crossing pulses; and
- speed computing means receiving the zero-crossing pulses, the phase angle signal, and the time signal as inputs, and responsive to the rotational speed of said encoder being above a predetermined lever for detecting the rotational speed of said encoder on the basis of the reciprocal of the time interval between a first one and a last one of a plurality of the zero-crossing pulses, and responsive to the rotational speed of said encoder being below the predetermined level for detecting the rotational speed of said encoder on the basis of the number of zero-crossing pulses appearing within a predetermined period of time and the phase angle signal.

3. A speed detecting apparatus according to claim 2, wherein said phase angle detecting means includes memory means for storing inverse sine functions of four quadrants, and quadrant deciding means for discriminating the quadrant of the one of the sine-wave signals on the basis of the positive and negative levels of the two sine-wave signals.

4. A speed detecting apparatus according to claim 2, wherein said speed computing means decides whether the rotational speed of said encoder is above or below the predetermined level on the basis of the difference between the present count of the zero-crossing pulses and the previous count of the zero-crossing pulses at a time earlier by the predetermined period of time than present time.

5. A speed detecting apparatus for detecting the rotational speed of a rotating body mechanically coupled to said apparatus, said apparatus comprising:
- an encoder for generating one cycle of each of two sine-wave signals, having a phase difference of 90° therebetween, each time the encoder angular position changes by a predetermined unit amount;
- pulse generating means responsive to one of the sine wave signals for generating a zero-crossing pulse at each zero-crossing point of the one of the sine-wave signals;
- phase angle detecting means responsive to the two sine-wave signals for generating a phase angle signal indicative of the phase angle of the one of the sine-wave signals;
- a clock pulse source for providing clock pulses having a predetermined frequency;
- time computing means responsive to the zero-crossing pulses and the clock pulses for generating a time signal by counting the clock pulses generated between two zero-crossing pulses; and
- speed computing means receiving the zero-crossing pulses, the phase angle signal, and the time signal as inputs, and responsive to the rotational speed of said encoder being above a predetermined level for detecting the rotational speed of said encoder on the basis of the ratio between the number of zero-crossing pulses occurring during a time interval and the duration of the time interval, and responsive to the rotational speed of said encoder being below the predetermined level for detecting the rotational speed of said encoder on the basis of the number of zero-crossing pulses appearing within a predetermined period of time and the phase angle signal.

6. A speed detecting apparatus for detecting the rotational speed of a rotating body mechanically coupled to said apparatus, said apparatus comprising:
- an encoder for generating one cycle of each of two sine-wave signals, having a phase difference of 90° therebetween, each time the encoder angular position changes by a predetermined amount;
- pulse generating means responsive to one of the sine wave signals for generating a zero-crossing pulse at each zero-crossing point of the one of the sine-wave signals;
- phase angle detecting means responsive to the two sine-wave signals for generating a phase angle signal indicative of the phase angle of the one of the sine-wave signals;
- reversible counter means for counting the zero-crossing pulses;
- a clock pulse source for providing clock pulses having a predetermined frequency;
- time computing means responsive to the zero-crossing pulses and the clock pulses for generating a time signal by counting clock pulses generated between two zero-crossing pulses;
- rotating direction deciding means responsive to the two sine-wave signals for discriminating the direction of rotation of said encoder;
- normal-reverse change-over means for applying said the zero-crossing pulses to said reversible counter means to increment or decrement the count of said reversible counter means depending on the discriminated direction of rotation of said encoder; and
- speed computing means receiving the zero-crossing pulses, the phase angle signal, and the time signal as inputs, and responsive to the rotational speed of said encoder being above a predetermined level for detecting the rotational speed of said encoder on the basis of the reciprocal of a time interval between a first one and a last one of a plurality of the zero-crossing pulses, and responsive to the rotational speed of said encoder being below the predetermined level for detecting the rotational speed of said encoder on the basis of the number of zero-crossing pulses appearing within a predetermined period of time and the phase angle signal.

7. A speed detecting apparatus for detecting the rotational speed of a rotating body mechanically coupled to said apparatus, said apparatus comprising:
an encoder for generating one cycle of a sine-wave signal each time the encoder angular position changes by a predetermined unit amount;
pulse generating means responsive to the sine wave signal for generating a zero-crossing pulse each time the sine-wave signal becomes zero;
phase angle detecting means responsive to the sine wave signal for generating a phase angle signal indicative of the phase angle of the sine-wave signal;
a clock pulse source for providing clock pulses having a predetermined frequency;
time computing means responsive to the zero-crossing pulses and the clock pulses for generating a time signal by counting clock pulses generated between two zero-crossing pulses;
first speed computing means receiving the zero-crossing pulses and the time signal for detecting the rotational speed of said encoder by dividing the number of zero-crossing pulses occurring during a time period by the duration of the time period;
second speed computing means receiving the zero-crossing pulses, the phase angle signal, and the time signal as inputs, for detecting the rotational speed of said encoder on the basis of the number of zero-crossing pulses appearing within a predetermined period of time and the phase angle signal; and
exchanging means responsive to the rotational speed of said encoder being above a predetermined level for activating said first speed computing means to detect the rotational speed of said encoder at high speeds and responsive to the rotational speed of said encoder being below the predetermined level for activating said second speed computing means to detect the rotational speed of said encoder at low speeds.

8. A speed detecting apparatus for detecting the rotational speed of a rotating body mechanically coupled to said apparatus, said apparatus comprising:
an encoder for generating one cycle of each of two sine wave signals, having a phase difference of 90° therebetween, each time the encoder angular position changes by a predetermined unit amount;
pulse generating means responsive to one of the sine wave signals for generating a zero-crossing pulse at each zero-crossing point of the waveform of the one of the sine-wave signals;
phase angle detecting means responsive to the two sine-wave signals for generating a phase angle signal indicative of the phase angle of the one of the sine-wave signals;
a clock pulse source for providing clock pulses having a predetermined frequency;
time computing means responsive to the zero-crossing pulses and the clock pulses for generating a time signal by counting clock pulses generated between two zero-crossing pulses;
first speed computing means receiving the zero-crossing pulses and the time signal for detecting the rotational speed of said encoder by dividing the number of zero-crossing pulses occurring during a time period by the duration of the time period;
second speed computing means receiving the zero-crossing pulses, the phase angle signal, and the time signal as inputs, for detecting the rotational speed of said encoder on the basis of the number of zero-crossing pulses appearing within a predetermined period of time and the phase angle signal; and
exchanging means responsive to the rotational speed of said encoder being above a predetermined level for activating said first speed computing means to detect the rotational speed of said encoder at high speeds and responsive to the rotational speed of said encoder being below the predetermined level for activating said second speed computing means to detect the rotational speed of said encoder at low speeds.

9. A speed detecting apparatus according to claim 8, wherein said phase angle detecting means includes memory means for storing inverse sine functions of four quadrants, and quadrant deciding means for discriminating the quadrant of the one of the sine-wave signals on the basis of the positive and negative levels of the two sine-wave signals.

10. A speed detecting apparatus according to claim 8, wherein said exchanging means decides whether the rotational speed of said encoder is above or below the predetermined level on the basis of the difference between the present count of the zero-crossing pulses and the previous count of the zero-crossing pulses at a time earlier by the predetermined period of time than present time.

11. A speed detecting apparatus for detecting the rotational speed of a rotating body mechanically coupled to said apparatus, said apparatus comprising:
an encoder for generating one cycle of each of two sine-wave signals, having a phase difference of 90° therebetween, each time the encoder angular position changes by a predetermined unit amount;
pulse generating means responsive to one of the sine wave signals for generating a zero-crossing pulse at each zero-crossing point of one of the sine-wave signals;
phase angle detecting means responsive to the two sine-wave signals for generating a phase angle signal indicative of the phase angle of the one of the sine-wave signals;
a clock pulse source for providing clock pulses having a predetermined frequency;
time computing means responsive to the zero-crossing pulses and the clock pulses for generating a time signal by counting clock pulses generated between two zero-crossing pulses;
reversible counter means for counting said zero-cross pulses;
rotating direction deciding means responsive to the two sine-wave signals for discriminating the direction of rotation of said encoder;
normal-reverse change-over means for applying said zero-crossing pulses to said reversible counter means to increment or decrement the count of said reversible counter means depending of the discriminated direction of rotation of said encoder;
first speed computing means receiving the zero-crossing pulses and the time signal for detecting the rotational speed of said encoder by dividing the number of zero-crossing pulses occurring during a time period by the duration of the time period;
second speed computing means receiving the zero-crossing pulses, the phase angle signal, and the time signal as inputs, for detecting the rotational speed of said encoder on the basis of the number of zero-crossing pulses appearing within a predetermined period of time and the phase angle signal; and exchanging means responsive to the rotational speed of said encoder being above a predetermined level for activating said first speed computing means to detect the rotational speed of said encoder at high speeds and responsive to the rotational speed of said encoder being below the predetermined level for activating said second speed computing means to detect the rotational speed of said encoder at low speeds.

* * * * *